United States Patent [19]

Frank

[11] Patent Number: 5,015,326
[45] Date of Patent: May 14, 1991

[54] COMPLIANT TAPE DISPENSING AND COMPACTING HEAD

[75] Inventor: Ed Frank, Glenolden, Pa.

[73] Assignee: The Boeing Company, Seattle, Wash.

[21] Appl. No.: 348,952

[22] Filed: May 8, 1989

[51] Int. Cl.[5] .................... B32B 31/20; B32B 31/04
[52] U.S. Cl. .................... 156/511; 156/517; 156/519; 156/523; 156/574; 156/353; 156/361
[58] Field of Search ............ 156/574, 523, 353, 361, 156/517, 516, 519, 511, 580.1, 582, 169, 166, 412

[56] References Cited

U.S. PATENT DOCUMENTS

| | | | |
|---|---|---|---|
| 4,052,246 | 10/1977 | Albareda et al. | 156/412 |
| 4,292,108 | 9/1981 | Weiss et al. | 156/523 X |
| 4,601,775 | 7/1986 | Grone | 156/523 |
| 4,696,707 | 9/1987 | Lewis et al. | 156/574 |
| 4,699,683 | 10/1987 | McCowin | 156/353 |
| 4,750,965 | 6/1988 | Pippel et al. | 156/523 X |
| 4,867,834 | 9/1989 | Alenskis | 156/523 |
| 4,869,774 | 9/1989 | Wisbey | 156/523 |
| 4,915,771 | 4/1990 | O'Brien et al. | 156/574 |

FOREIGN PATENT DOCUMENTS 2529871  1/1984  France ................ 156/574

Primary Examiner—Michael W. Ball
Assistant Examiner—Jeff H. Aftergut
Attorney, Agent, or Firm—Jones, Tullar & Cooper

[57] ABSTRACT

A compliant tape dispensing and compacting head and method by which tape is dispensed and compacted onto a contoured surface. Tape is dispensed from a plurality of tape supply reels onto the contoured surface and subject to the action of a compacting head. The compacting head is capable of being biased in the compaction direction, i.e., against the contoured surface, and adjusted by the biasing force to follow the contour of the contoured surface so that each discrete tape strip has a compacting force applied thereto which is normal to the contoured surface at the tape strip location.

15 Claims, 6 Drawing Sheets

COMPLIANT TAPE DISPENSING AND COMPACTING HEAD

FIELD OF THE INVENTION

This invention relates generally to tape dispensing and compacting equipment, and more particularly to an apparatus (head) and method for dispensing and compacting preimpregnated composite tape.

Composite tape refers to resin preimpregnated tape having filaments, such as fiberglass filaments, embedded therein. It also refers to resin preimpregnated filaments, such as fiberglass filaments. In the later case the preimpregnated filaments are known as rovings.

The invention was developed primarily for use in fabricating structural parts, i.e., parts that are capable of carrying load.

BACKGROUND OF THE INVENTION

Structural parts capable of carrying load and made from composite material in tape form are constructed by the build-up of a successive application of layers of the tape onto, for example, a mandrel (tool). The built-up layers or lay-up is non-structural and is typically rendered structural by a curing process.

Composite materials have exhibited phenomenal advancements during the last two decades. Their structural properties have been steadily increased, and the unique fibers now afford opportunities, for example, In the aircraft industry to improve airframe performance in an increasing number of primary structural applications with significant reductions in weight.

Again in the aircraft industry, to achieve, for example, a reasonable level of airframe production, the conventional aluminum fabrication techniques presently employed in composite airframe fabrication must be replaced by a new construction methodology. Monocoque, or a unitized, fuselage design will provide two essential advancements in composite airframe fabrication: (1) minimization of individual part requirements thereby reducing cost; and (2) facilitation of automation.

In keeping with the desire to improve airframe production as well as overall production of all parts, several tape dispensing and compaction heads have been developed and are now in use by the assignee of the present application. These are disclosed in U.S. Pat. Nos. 3,775,219; 4,234,374; 4,259,144; 4,382,836; and 4,560,433. These heads are used to dispense and compact tape onto a generally flat surface.

There are many applications, however, where the structural part is not flat and consequently the surface of the tool onto which the tape is to be dispensed and compacted for forming the structural part is not flat and instead is contoured.

It would be desirable to therefore have a way of dispensing and compacting tape onto a contoured surface, and even a compoundly contoured surface.

SUMMARY OF THE INVENTION

The invention provides both a structural assembly (head) and a method for dispensing and compacting composite tape onto a contoured surface.

The present invention was developed to preferably dispense and compact rovings. It has been found that dispensing and compacting onto a contoured surface is more readily achieved if the tape is in the form of a roving. Because of the capability of dispensing and compacting onto a contoured surface, the head and method are characterized a being compliant.

The compliant head includes a plurality of tape or roving supply reels, an equal plurality of tape or roving guides and a compacting structure. The compacting structure possesses the capability of adapting itself t the shape of the contoured surface so that it imparts a compacting force to each strip of tape or roving which has been dispensed to the compacting structure and contoured surface interface so that the force is normal to the contoured surface at the tape or roving strip location.

The compacting structure can be adapted to manage any size structure by adding or substracting to the compacting structure as a function of the number of tape or roving supply reels. A correspondingly provided number of tape guides is also necessary.

An important feature of the head and method aspects of the invention is surface shape compatability which is defined as compliance.

BRIEF DESCRIPTION OF THE DRAWINGS

Seven figures have been selected to demonstrate a preferred embodiment of the invention. While generally schematic these figures are sufficient to enable those skilled in the art to practice the invention. Included are.

DETAILED DESCRIPTION OF THE PREFERRED EMBODIMENT

A preferred embodiment of the invention shown in FIGS. 1-7 will now be described in greater detail.

Figure 1:
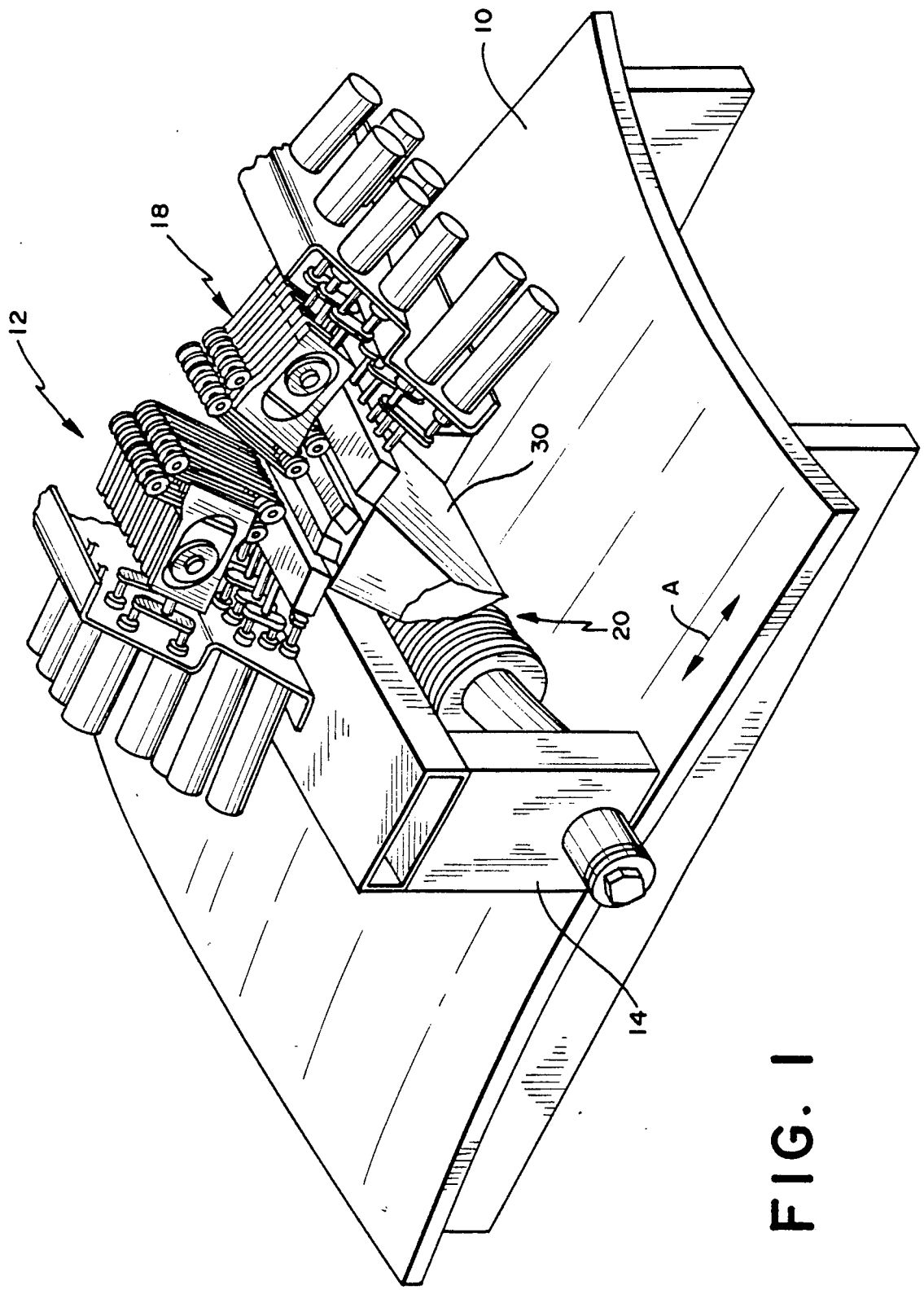
FIG. 1, which is a perspective view of a dispensing and compacting head assembly in accordance with a preferred embodiment of the invention.

There is schematically shown in FIG. 1 a contoured surface 10, which may be compoundly contoured, i.e., in two directions, over which a compliant tape dispensing and compacting head 12 passes. The head 12 is mounted to a gantry 14 which is displaceable by means (not shown) in the direction indicated by the double-headed arrow A. In the illustration shown in FIG. 1, the contoured surface 10 represents the tool surface. Alternatively, the surface 10 may be flat and a tool with a compound contoured surface placed thereon onto which the dispensed tape is compacted.

The head 12 comprises three basic subassemblies, namely, tape supply reel subassembly including reels 16 (FIG. 2), tape guide (dispensing) subassembly 18; and tape compacting subassembly 20.

Figure 2:
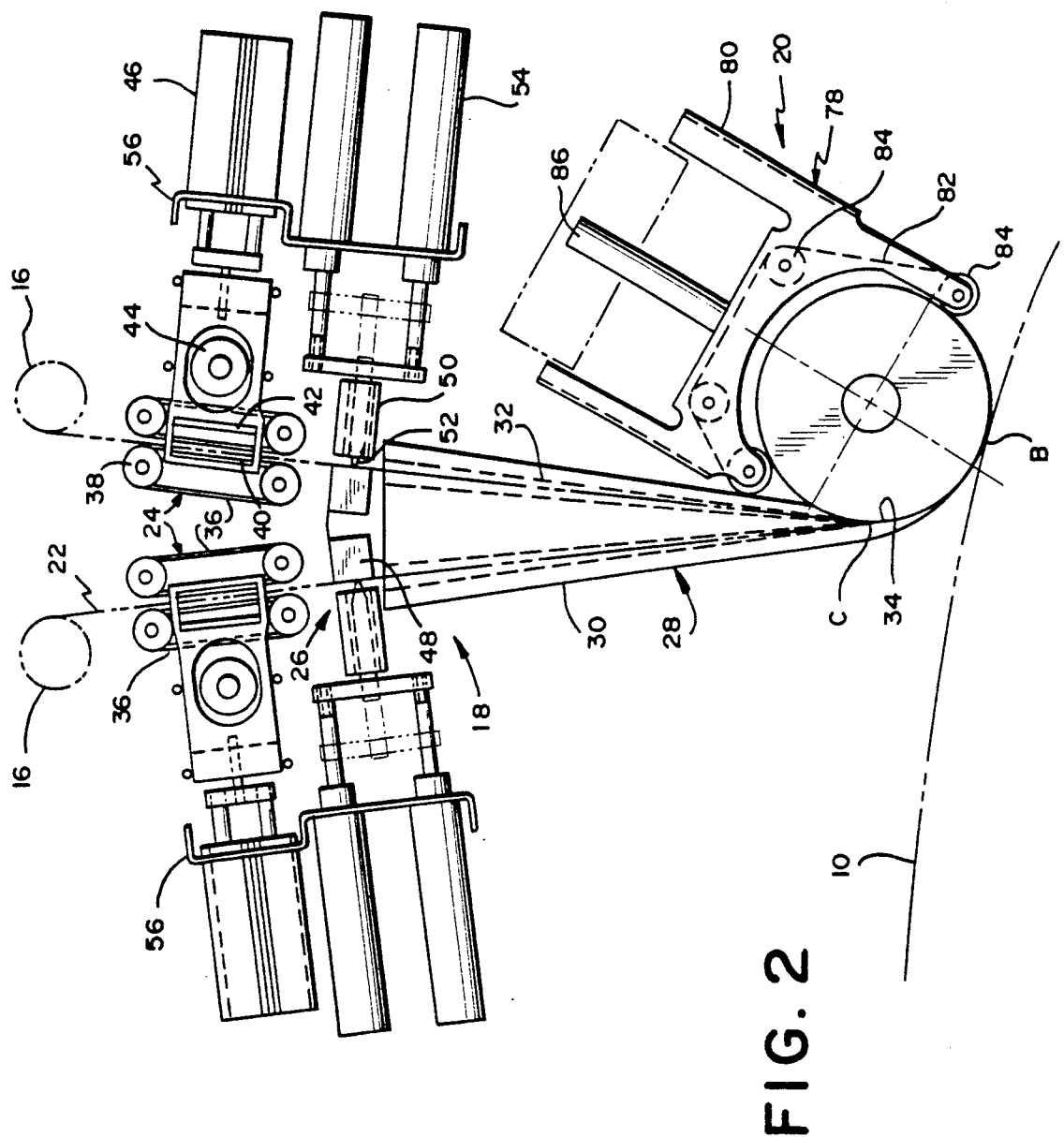
FIG. 2, which is a side elevational view of the dispensing and compacting head assembly shown in FIG. 1.

The tape supply reels 16 may be mounted to the gantry 14 or to supporting frames of the guide subassembly 18. Neither mode of mounting is shown. The tape 22, preferably in the form of a roving, i.e., a series of filaments that can be either in a round or flat configuration, is withdrawn from the individual reel, threaded through the guide subassembly 18 from which it is dispensed to the compacting subassembly 20 and situated at the interface B (FIG. 2) between the surface 10 and the extreme lower region (as seen in FIG. 2) of the compacting subassembly 20. Round configuration rovings that are 6 mil thick and 0.1 in. wide have been successfully used.

As is known from the above noted patents, the tape 22 is compacted at the interface B by adjusting the clearance between the surface 10 and noted lower region of the compacting subassembly 20 to be less than the thickness of the tape 22.

The guide subassembly 18 includes a tape dispensing drive 24 (FIG. 8), a tape severing apparatus 26 and an air bearing 28. The guide subassembly 18 is mounted to the gantry 14 in a conventional manner, not shown.

The air bearing 28 comprises truncated, transversely elongated (FIG. 1) housing 30 within which a plurality of air passages 82 are defined. The air passages 32 extend in the vertical direction (FIG. 2) of the housing 30 and terminate in transverse axial alignment at the apex transverse plane C. At this location the housing 30 is curved and defines a transversely extending compatibility surface 34 which corresponds to a circular segment of the assembled discs of the tape compacting subassembly 20, each air passage being aligned to cooperate with a respective one of the discs.

The number of air passages 32 is, therefore, equal to the number of discs. This number also corresponds to the number of tape dispensing drives and tape severing apparatuses.

Figure 3:
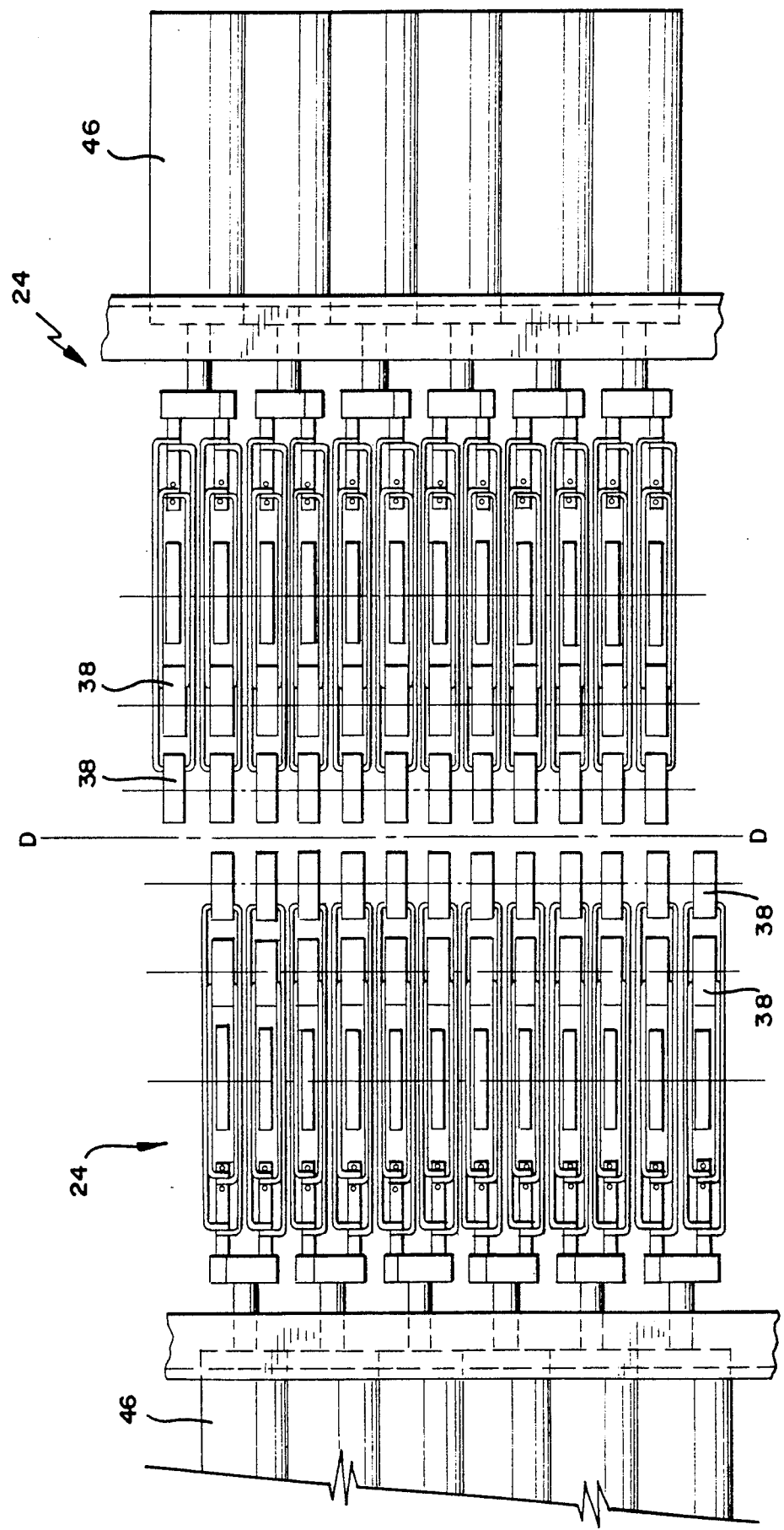
FIG. 3, which is a top view illustrating the air cylinder subassembly of the dispensing and compacting head assembly shown in FIGS. 1 and 2.

In order to reduce space requirements, the passages, drives and severing apparatuses are staggered in the transverse direction as shown in FIGS. 1-3, rather than being aligned all along a common axis. For example, as shown in FIG. 3, twenty-four drives are shown, with twelve on each side of the plane D.

Each tape dispensing drive 24 includes a pair of spaced apart feed belts 36 mounted on sprockets 38, which are driven one in each pair by, for example, a drive motor (not shown). A fixed platen 40 is associated with one belt while a drive platen 42 is associated with the other belt. A drive sprocket 44 actuated by solenoids 46 moves the drive platen 42 in the direction of the fixed platen 40 and in the process causes the belts to engage the roving 22 and advance it toward its corresponding air passage 32.

Each tape severing apparatus 26 includes a cutting anvil 48, a cutter guide 50 within which a chisel cutter 52 is reciprocally mounted, and a pair of air cylinders 54 for reciprocating the chisel cutter 52 against the anvil 48 to sever the roving 22.

The solenoids 46 and air cylinders 54 of the guide subassembly is are mounted on a plate 56.

The compacting subassembly 20 includes a plurality of discs 58 (FIG. 4) each mounted on a flexible shaft 60, preferably an edgewise wound spring pinned at its ends 62 and 64 to the gantry 14. A flexible nylon air sleeve 66 surrounds the flexible shaft 60. The sleeve 66 has its ends received in and fastened to air seal blocks 68, and is sufficiently flexible to permit movement of the shaft 60 in the direction of the double-headed arrow E (FIG. 4).

The discs 58 are actually mounted on the sleeve 66 and are retained in a fixed transverse location. Flexing of the shaft 60 and sleeve 66 allows for relative displacement of the discs 58 as shown, for example, in FIGS. 7a-7e.

Figure 5:
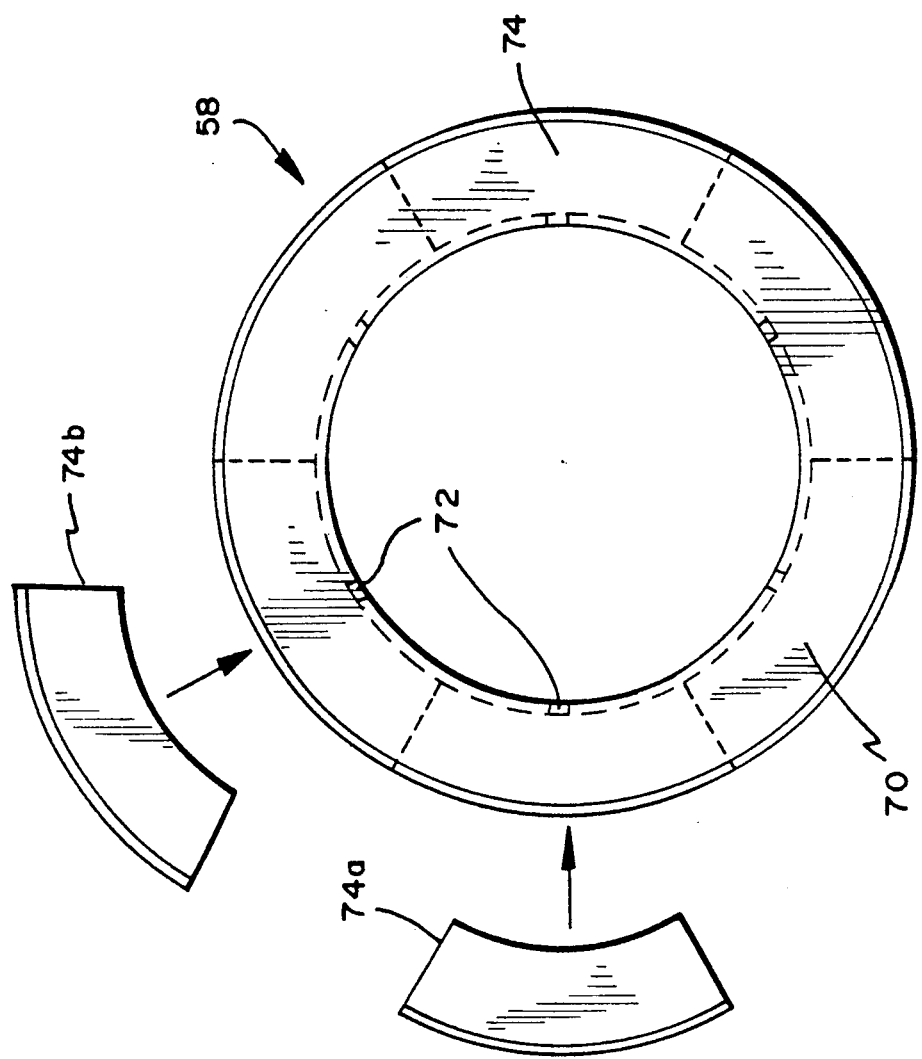
FIG. 5, which is a planar view of a compacting wheel of the subassembly shown in FIG. 4.
Figure 6:
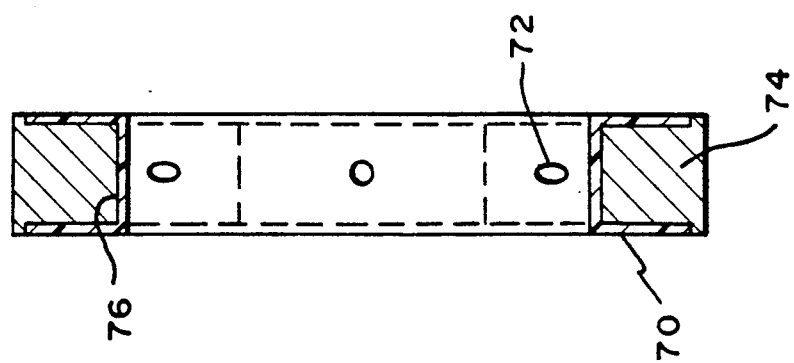
FIG. 6, which is a cross-sectional view of the wheel shown in FIG. 5, taken along line 6—6 of FIG. 5.
Figure 7A:
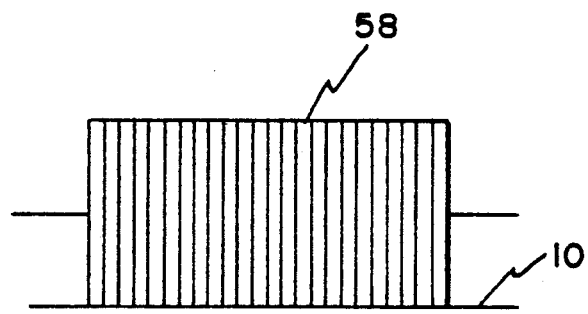
FIG. 7, which comprises FIG. 7a-7e illustrating the flexible capability of the subassembly of FIG. 4 in conjunction with a flat surface (7a) and varying contoured surfaces (7b-7e).
Figure 7B:
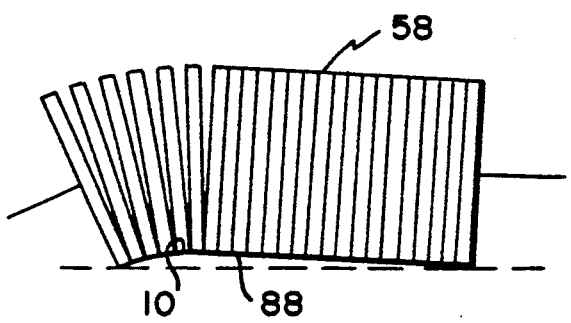
Figure 7C:
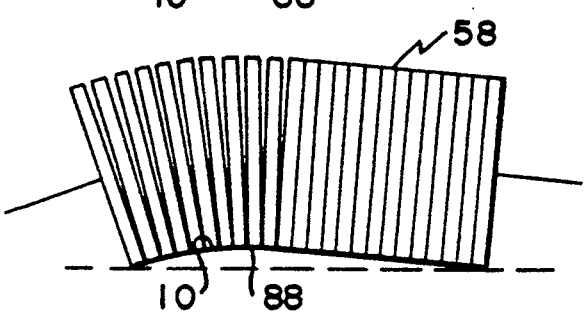
Figure 7D:
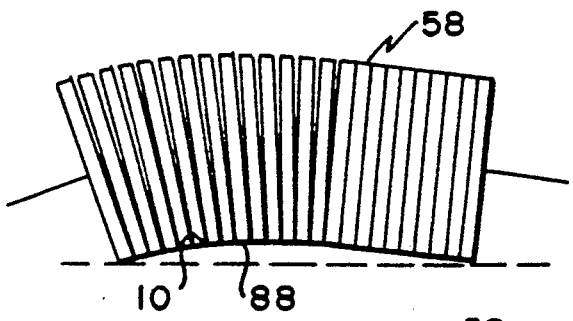
Figure 7E:
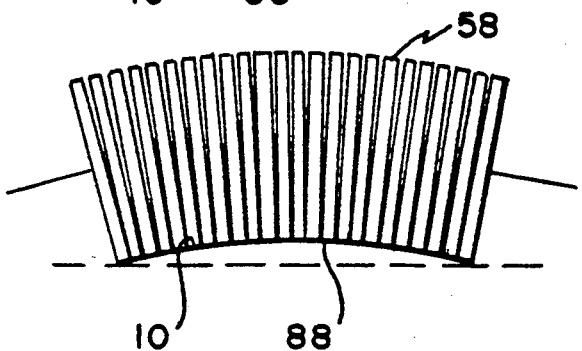

The construction of the disc 58 is shown in FIGS. 5 and 6. Each disc includes a moulded nylon retainer sheave 70 having a plurality of air ports 72 and a plurality of porous inserts 74 made of sintered metal or other porous material bonded at their engagement faces 74a, 74b and to the inside surface 76 of the sheave 70. The number of ports 72 is equal to the number of inserts 74.

Figure 4:
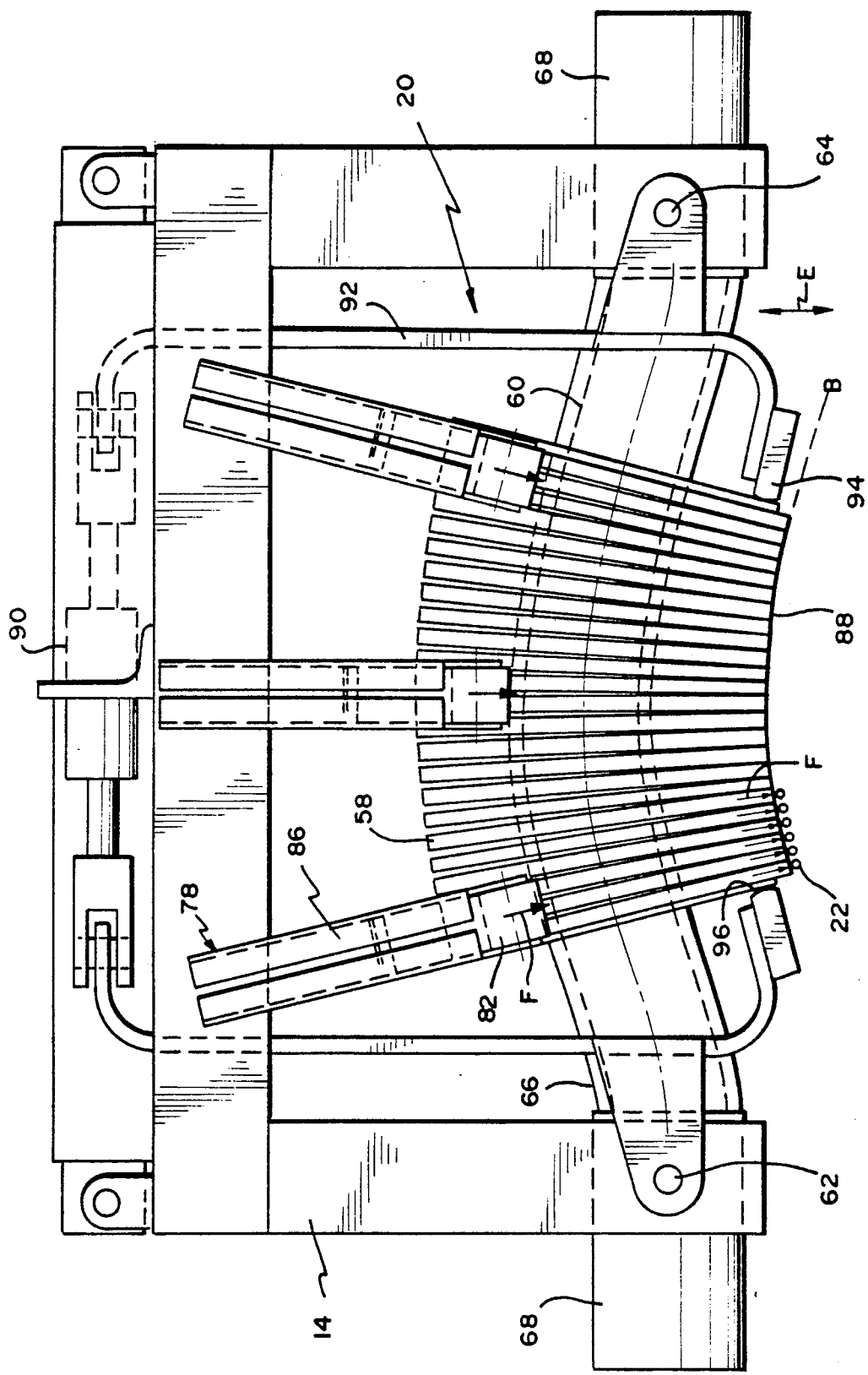
FIG. 4, which is a front elevational view of the flexibly mounted compacting wheel subassembly.

As shown in FIG. 4, three compacting units 78 mounted to the gantry 14 are provided. Each unit 78 includes, as shown in FIG. 2, a frame 80, a pressure belt 82 extending about idlers rollers 84 mounted to the frame. The belt embraces a portion of one or more discs 58 and applies a uniform force F over the embraced portion which displaces or biases the discs toward the surface 10. For this purpose one or more air cylinders 86 are provided and mounted on the frame 80.

While only a selected number of discs 58 are directly engaged, the force F is felt by all the discs because of the common mounting of the discs on the shaft 60 and sleeve 66. If desired the number of compacting units can be changed and the belt design altered so that each disc is embraced by a belt. In any case, it is only necessary that a substantially uniform compacting force be applied to the discs 58 at the interface B.

At the interface B, it is preferable that the discs 58 define a continuous surface 88 at the interface B or tape engaging region of the discs. In this way the individual rovings 22 are not trapped between discs in the process of compaction. For this purpose, a further disc displacement structure is provided. This structure includes a double acting actuator 90 mounted to the gantry 14 and a pair of symmetrically disposed arms 92 at one end of each of which there is provided a pad 94 each having a convex surface 96 which engages a side of the end discs while permitting the end discs to be displaced in the direction E. The force provided by the actuator 90 through the arms 92 and pads 94 to the two sides of the discs 58 produces a further displacement of these discs resulting in the surface 88.

To insure that the tape or roving 22 is displaced and compacted smoothly, the air passages 32 noted above are provided as well as the air sleeve 66, the air ports 72 and the porous inserts 74. Positive air pressure is maintained in the air passages 32 so that the rovings 22 travel a path through their respective passages without engaging the surface defining the passage. The rovings pass through their respective passages and engage the surface 34 on their way to the interface B. The rovings are compacted at the interface B as noted above. In the process, the interface is provided with a so-called air-layer which aids in offsetting any adverse effects of the inherent tackiness of the rovings. To achieve the air-layer, pressurized air travels through the sleeve 66 and out the ports 72 and porous inserts 74.

FIG. 7 illustrates some of the different contours of the surface 10 which the head according to the present invention can accomodate, and in the process the varying orientation of the discs 58. Note, however, that the surface 88 remains continuous, and that this continuity is maintained even when the surface 10 is confoundly contoured, i e., in at least two directions, such as the surface 10 shown in FIG. 1.

Once the lay-up is completed by successive passes of the head 12, the lay-up is removed and cured in a conventional manner to produce a structural part of the given contour.

Because of surface shape compliance effected by the subassembly 20, any shaped lay-up is possible, while retaining desired roving spacing and placement resulting in a consistent lay-up and improved structural part.

What is claimed is:

1. A compliant tape dispensing and compacting head, comprising:
   a plurality of tape supply means;
   an equal plurality of tape guide means; and
   an equal plurality of tape compacting means for compacting tape received from a respective one of said plurality of tape guide means, said plurality of tape compacting means including:
   displacement means for relative displacement of the tape compacting means with respect to each other; and
   a flexible shaft defining a longitudinal axis being capable of flex in a direction normal to said axis and a plurality of discs mounted adjacent to each other on said flexible shaft along its longitudinal axis, wherein said discs are biased by said displacement means in a direction normal to said longitudinal axis providing thereby a compaction force to said discs.

2. The compliant tape dispensing and compacting head as defined in claim 1, wherein said guide means includes a plurality of air passages through each of which a path is defined for movement of tape from a respective tape supply means and dispensing said tape to a respective compacting means.

3. The compliant tape dispensing and compacting head as defined in claim 2, Wherein said guide means further includes tape drive means and tape severing means associated with each air passage, each drive means engaging tape from a respective tape supply means and dispensing said tape by advancing said tape from the respective tape supply means past a respective tape severing means and through a respective air passage.

4. The compliant tape dispensing and compacting head as defined in claim 3, wherein the plurality of air passages comprise an air bearing, and wherein said guide means further includes means for maintaining a positive air pressure in each passage of said air bearing.

5. The compliant tape dispensing and compacting head as defined in claim 1, wherein said plurality of tape compacting means includes displacement means for relative displacement of the tape compacting means with respect to each other.

6. A compliant tape dispensing and compacting head, comprising:
   a plurality of tape supply means;
   an equal plurality of tape guide means; and
   an equal plurality of tape compacting means for compacting tape received from a respective one of said plurality of tape guide means, said plurality of tape compacting means including:
   displacement means for relative displacement of the tape compacting means with respect to each other; and
   a flexible shaft defining a longitudinal axis and a plurality of discs mounted adjacent to each other on said flexible shaft along its longitudinal axis, wherein:
   (i) said discs are biased by said displacement means in a direction normal to said longitudinal axis providing thereby a compaction force to said discs;
   (ii) the mounted discs define a continuous surface in the direction of said longitudinal axis at the tape engaging regions of the discs; and
   (iii) said plurality of tape compacting means further includes further displacement means for biasing said discs together in the direction of said longitudinal axis at least at the tape engaging region of the discs.

7. The compliant tape dispensing and compacting head as defined in claim 6, wherein each disc comprises a sheave and a plurality of porous inserts, said sheave having a plurality of pressure ports equal in number to the plurality of porous inserts, said porous inserts having an outer surface which define said continuous surface.

8. The compliant tape dispensing and compacting head as defined in claim 7, wherein each porous insert is arcuately shaped and further have lateral end surfaces which abut with and are joined to adjacent lateral end surfaces of another of said porous inserts.

9. The compliant tape dispensing and compacting head as defined in claim 7, wherein said plurality of tape compacting means further includes a mounting sleeve coextensive with and surrounding said flexible shaft in the direction of said longitudinal axis, said mounting sleeve defining an air passage, said discs being mounted on said mounting sleeve so that each pressure port is in communication with the air passage defined by said mounting sleeve.

10. A compliant tape dispensing and compacting head, comprising:
    a plurality of tape supply means;
    an equal plurality of tape guide means, said guide means including a plurality of air passages through each of which a path is defined for movement of tape from a respective tape supply means for dispensing said tape to a respective compacting means; and
    an equal plurality of tape compacting means for compacting tape received from a respective one of said plurality of tape guide means, said plurality of tape compacting means including:
    a flexible shaft defining a longitudinal axis being capable of flex in a direction normal to said axis and a plurality of discs mounted adjacent to each other on said flexible shaft along its longitudinal axis; and
    displacement means for biasing said discs in a direction normal to said longitudinal axis providing thereby a compaction force to said discs.

11. A compliant tape dispensing and compacting head, comprising:
    a plurality of tape supply means;
    an equal plurality of tape guide means, said guide means including a plurality of air passages through each of which a path is defined for movement of tape from a respective tape supply for dispensing said tape to a respective compacting means; and
    an equal plurality of tape compacting means for compacting tape received from a respective one of said plurality of tape guide means, said plurality of tape compacting means including:
    a flexible shaft defining a longitudinal axis and a plurality of discs mounted adjacent to each other on said flexible shaft along its longitudinal axis; and displacement means for biasing said discs in a direction normal to said longitudinal axis providing thereby a compaction force to said discs, wherein:
(i) the mounted discs define a continuous surface in the direction of said longitudinal axis at the tape engaging region of the discs; and
(ii) said plurality of tape compacting means further includes further displacement means for biasing said discs together in the direction of said longitudinal axis at least at the tape engaging region of the discs.

12. A compliant tape dispensing and compacting head, comprising:
a plurality of tape supply means;
an air bearing defining a plurality of air passages equal in number to the plurality of tape supply means, each air passage defining a path for the movement of tape from a respective tape supply means;
a flexible shaft defining a longitudinal axis and a plurality of discs mounted adjacent to each other on said flexible shaft along its longitudinal axis, each said discs being associated with a respective one of said air passages;
displacement means for biasing said discs in a direction normal to said longitudinal axis providing thereby a compaction force to said discs; and
further displacement means for biasing said discs together in the direction of said longitudinal axis at least at the tape engaging region of the discs, wherein the mounted discs define a continuous surface in the direction of said longitudinal axis at the tape engaging region of the discs.

13. The compliant tape dispensing and compacting head as defined in claim 12, further comprising:
a mounting sleeve coextensive with and surrounding said flexible shaft in the direction of said longitudinal axis, said mounting sleeve defining an air passage, wherein each disc comprises a sheave and a plurality of porous inserts, said sheave having a plurality of pressure ports equal in number to the plurality of porous inserts, said porous inserts having an outer surface which define said continuous surface, and wherein said discs are mounted on said mounting sleeve so that each pressure port is in communication with the air passage defined by said mounting sleeve.

14. A compliant tape dispensing and compacting head, comprising:
a plurality of tape supply means;
an air bearing defining a plurality of air passages equal in number to the plurality of tape supply means, each air passage defining a path for the movement of tape from a respective tape supply means;
a flexible shaft defining a longitudinal axis being capable of flex in a direction normal to said axis and a plurality of discs mounted adjacent to each other on said flexible shaft along its longitudinal axis, each said disc being associated with a respective one of said air passages; and
displacement means for biasing said discs in a direction normal to said longitudinal axis providing thereby a compaction force to said discs.

15. The compliant tape dispensing and compacting head as defined in claim 14, wherein the mounted discs define a continuous surface in the direction of said longitudinal axis at the tape engaging region of the discs.

* * * * *